US007657884B2

United States Patent
Okonnen et al.

(10) Patent No.: US 7,657,884 B2
(45) Date of Patent: *Feb. 2, 2010

(54) ELECTRONIC DEVICE SUPPORTING MULTIPLE UPDATE AGENTS

(75) Inventors: Harri Okonnen, Dana Point, CA (US); Bindu Rama Rao, Laguna Niguel, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/807,694

(22) Filed: Mar. 24, 2004

(65) Prior Publication Data

US 2004/0243993 A1    Dec. 2, 2004

Related U.S. Application Data

(60) Provisional application No. 60/457,026, filed on Mar. 24, 2003.

(51) Int. Cl.
*G06F 9/44* (2006.01)
*G06F 9/445* (2006.01)
*G06F 17/30* (2006.01)

(52) U.S. Cl. .................. 717/168; 717/177; 707/10

(58) Field of Classification Search ............... 717/173, 717/171, 175, 168, 178; 709/223; 707/10; 714/55

See application file for complete search history.

(56) References Cited

U.S. PATENT DOCUMENTS

| | | | |
|---|---|---|---|
| 5,261,055 A | 11/1993 | Moran et al. ............. 395/275 |
| 5,442,771 A | 8/1995 | Filepp et al. ............. 395/650 |
| 5,479,637 A | 12/1995 | Lisimaque et al. ........ 395/430 |
| 5,579,522 A | 11/1996 | Christeson et al. ........ 395/652 |
| 5,596,738 A | 1/1997 | Pope ........................ 395/430 |
| 5,598,534 A | 1/1997 | Haas ..................... 395/200.09 |
| 5,608,910 A | 3/1997 | Shimakura ................ 395/670 |
| 5,623,604 A | 4/1997 | Russell et al. .......... 395/200.1 |
| 5,666,293 A | 9/1997 | Metz et al. ............. 395/200.5 |
| 5,708,776 A * | 1/1998 | Kikinis ..................... 714/55 |
| 5,752,039 A | 5/1998 | Tanimura ................... 395/712 |
| 5,778,440 A | 7/1998 | Yiu et al. .................. 711/154 |
| 5,790,974 A | 8/1998 | Tognazzini ................ 701/204 |

(Continued)

OTHER PUBLICATIONS

"Focus on OpenView A guide to Hewlett-Packard's Network and Systems Management Platform", Nathan J. Muller, pp. 1-291, CBM Books, published 1995.

(Continued)

*Primary Examiner*—Wei Y Zhen
*Assistant Examiner*—Chih-Ching Chow

(57) ABSTRACT

Disclosed herein is an electronic device network. The network may include a plurality of servers and a plurality of an electronic devices communicatively coupled to at least one of the plurality of servers. The electronic device may be adapted to employ at least one of a plurality of update agents resident in the electronic devices to update one of software and firmware in the electronic devices. The electronic devices may also be adapted to provisioning the plurality of update agents with parameters and data used to facilitate update operations in the electronic device. The electronic device may support multiple update agents that are provisioned using OTASP or OTAPA or related techniques. During the provisioning of an electronic device, one or more update agents resident in the electronic device may also be provisioned.

33 Claims, 2 Drawing Sheets

U.S. PATENT DOCUMENTS

| | | | |
|---|---|---|---|
| 5,878,256 A | 3/1999 | Bealkowski et al. | 395/652 |
| 5,960,445 A | 9/1999 | Tamori et al. | 707/203 |
| 6,009,497 A | 12/1999 | Wells et al. | 711/103 |
| 6,038,636 A | 3/2000 | Brown, III et al. | 711/103 |
| 6,064,814 A | 5/2000 | Capriles et al. | 395/701 |
| 6,073,206 A | 6/2000 | Piwonka et al. | 711/102 |
| 6,073,214 A | 6/2000 | Fawcett | 711/133 |
| 6,088,759 A | 7/2000 | Hasbun et al. | 711/103 |
| 6,105,063 A | 8/2000 | Hayes, Jr. | 709/223 |
| 6,112,024 A | 8/2000 | Almond et al. | 395/703 |
| 6,112,197 A | 8/2000 | Chatterjee et al. | 707/3 |
| 6,126,327 A | 10/2000 | Bi et al. | 395/200.51 |
| 6,128,695 A | 10/2000 | Estakhri et al. | 711/103 |
| 6,157,559 A | 12/2000 | Yoo | 365/52 |
| 6,163,274 A | 12/2000 | Lindgren | 340/825.44 |
| 6,198,946 B1 | 3/2001 | Shin et al. | 455/561 |
| 6,249,817 B1 * | 6/2001 | Nakabayashi et al. | 709/224 |
| 6,279,153 B1 | 8/2001 | Bi et al. | 717/11 |
| 6,282,709 B1 * | 8/2001 | Reha et al. | 717/175 |
| 6,311,322 B1 | 10/2001 | Ikeda et al. | 717/1 |
| 6,438,585 B2 | 8/2002 | Mousseau et al. | 709/206 |
| 6,493,871 B1 * | 12/2002 | McGuire et al. | 717/173 |
| 6,546,419 B1 * | 4/2003 | Humpleman et al. | 709/223 |
| 6,553,375 B1 * | 4/2003 | Huang et al. | 707/10 |
| 6,636,958 B2 * | 10/2003 | Abboud et al. | 711/173 |
| 6,690,390 B1 * | 2/2004 | Walters et al. | 715/705 |
| 6,915,325 B1 * | 7/2005 | Lee et al. | 709/202 |
| 6,941,453 B2 * | 9/2005 | Rao | 713/2 |
| 6,976,251 B2 * | 12/2005 | Meyerson | 717/173 |
| 6,990,660 B2 * | 1/2006 | Moshir et al. | 717/171 |
| 7,080,372 B1 * | 7/2006 | Cole | 717/173 |
| 2001/0029178 A1 | 10/2001 | Criss et al. | 455/419 |
| 2001/0047363 A1 | 11/2001 | Peng | 707/104.1 |
| 2001/0048728 A1 | 12/2001 | Peng | 375/354 |
| 2002/0078209 A1 | 6/2002 | Peng | 709/227 |
| 2002/0116261 A1 | 8/2002 | Moskowitz et al. | 705/14 |
| 2002/0131404 A1 | 9/2002 | Mehta et al. | 370/352 |
| 2002/0138567 A1 * | 9/2002 | Ogawa | 709/203 |
| 2002/0152005 A1 | 10/2002 | Bagnordi | 700/234 |
| 2002/0156863 A1 | 10/2002 | Peng | 709/217 |
| 2002/0157090 A1 | 10/2002 | Anton, Jr. | 717/178 |
| 2003/0033599 A1 | 2/2003 | Rajaram et al. | 717/173 |
| 2003/0037075 A1 | 2/2003 | Hannigan et al. | 707/500 |
| 2003/0055931 A1 * | 3/2003 | Cravo De Almeida et al. | 709/223 |
| 2003/0061384 A1 | 3/2003 | Nakatani | 709/245 |
| 2003/0065738 A1 * | 4/2003 | Yang et al. | 709/215 |
| 2004/0015940 A1 * | 1/2004 | Heisey et al. | 717/168 |
| 2004/0031029 A1 * | 2/2004 | Lee et al. | 717/171 |
| 2004/0098715 A1 * | 5/2004 | Aghera et al. | 717/173 |
| 2004/0230965 A1 * | 11/2004 | Okkonen | 717/168 |

OTHER PUBLICATIONS

"Client Server computing in mobile environments", J. Jing et al, ACM Computing Surveys, vol. 31, Issue 2, pp. 117-159, ACM Press, Jul. 1999.

"ESW4: enhanced scheme for WWW computing in wireless communication environments", S. Hadjiefthymiades, et al, ACM SIGCOMM Computer Communication Review, vol. 29, Issue 5, pp. 24-35, ACM Press, Oct. 1999.

"Introducing quality-of-service and traffic classes in wireless mobile networks", J. Sevanto, et al, Proceedings of the $1^{st}$ ACM international workshop on Wireless mobile multimedia, pp. 21-29, ACM Press, 1998.

"Any Network, Any Terminal, Anywhere", A. Fasbender et al, IEEE Personal Communications, Apr. 1999, pp. 22-30, IEEE Press, 1999.

* cited by examiner

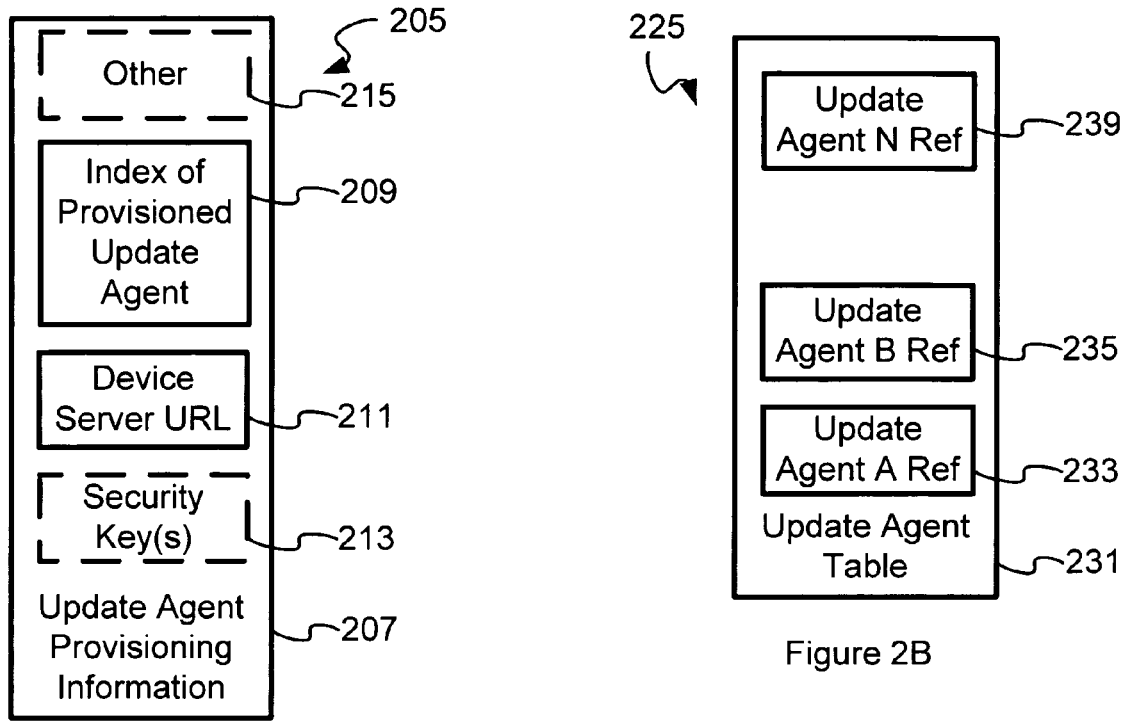
Figure 2A
Figure 2B
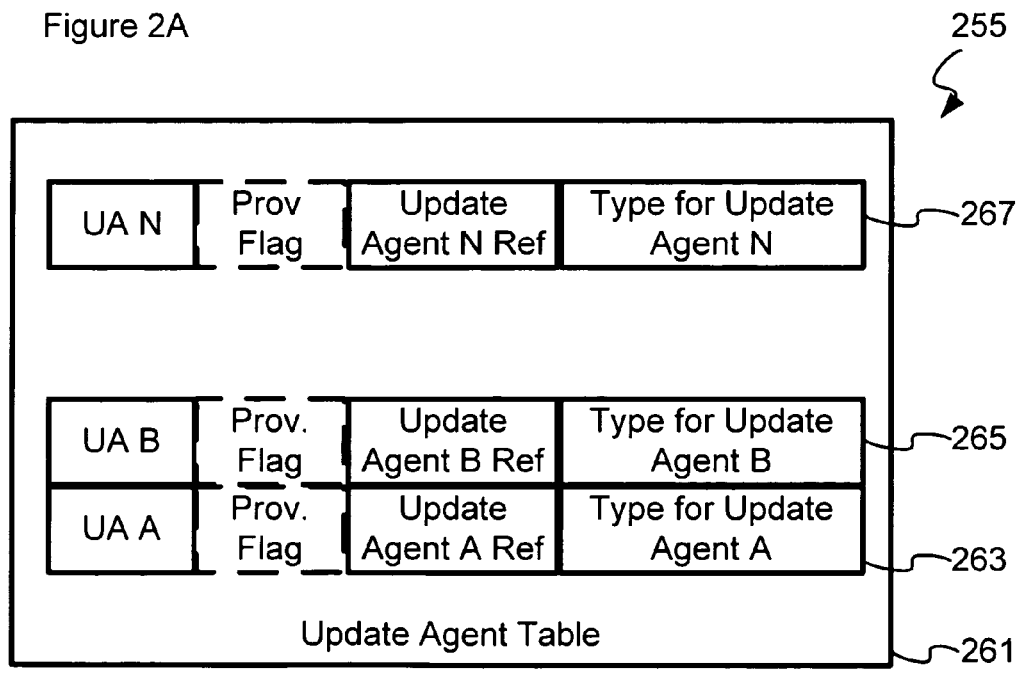
Figure 2C

ELECTRONIC DEVICE SUPPORTING MULTIPLE UPDATE AGENTS

CROSS-REFERENCE TO OTHER APPLICATIONS

The present application makes reference to, claims priority to, and claims benefit of U.S. Provisional Patent Application Ser. No. 60/457,026, entitled "ELECTRONIC DEVICE SUPPORTING MULTIPLE UPDATE AGENTS ", filed Mar. 24, 2004, the complete subject matter of which is hereby incorporated herein by reference, in its entirety.

The present application also hereby incorporates herein by reference the complete subject matter of U.S. Provisional Patent Application having Ser. No. 60/446,494, filed Feb. 11, 2003, in its entirety.

The present application also hereby incorporates herein by reference the complete subject matter of PCT Application having publication number WO 02/41147 A1, and having application number PCT/US01/44034, filed on Nov. 19, 2001, in its entirety.

The present application also hereby incorporates herein by reference the complete subject matter of U.S. Provisional Patent Application having Ser. No. 60/249,606, filed Nov. 17, 2000, in its entirety.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

Electronic devices (i.e., mobile electronic devices having software/firmware), for example, mobile cellular phones, personal digital assistants (PDA's), pagers, MP3 players, digital cameras, etc. often contain firmware and/or application software that are either provided by the manufacturers of the electronic devices, telecommunication carriers, or third parties. These firmware and application software often contain bugs. New versions (updates) of the firmware and software are periodically made available to fix the bugs, introduce new features, delete features, etc.

Further limitations and disadvantages of conventional and traditional approaches will become apparent to one of skill in the art, through comparison of such systems with some aspects of the present invention as set forth in the remainder of the present application with reference to the drawings appended hereto.

SUMMARY OF THE INVENTION

Aspect of the present invention may be found in an electronic device network. The network may comprise a plurality of servers and a plurality of an electronic devices communicatively coupled to at least one of the plurality of servers. The electronic devices may be adapted to employ at least one of a plurality of update agents resident in the electronic devices to update one of software and firmware in the electronic devices. The electronic devices are also adapted to provisioning the plurality of update agents with parameters and data used to facilitate update operations in the electronic device.

In an embodiment according to the present invention, an electronic device may comprises random access memory and non-volatile memory. The non-volatile memory may comprise a plurality of components. The plurality of components may comprise at least one of an update application loader, firmware, an operating system, and provisioned data. The provisioned data may comprise update agent provisioning information and a number assignment module.

In an embodiment according to the present invention, the network may further comprise at least one of an update server, and a plurality of generators. The generators may be adapted to generate updates able to be processed by at least one provisioned update agent in electronic device. The update server may be adapted to store updates accessible by the plurality of servers. The plurality of servers may be communicatively coupled to the update server.

In an embodiment according to the present invention, the electronic device may further comprise a provisioned data unit adapted to store information related to an end-user's electronic device subscription. The provisioned data unit may be programmed during number assignment module programming activity.

In an embodiment according to the present invention, the number assignment module programming activity may comprise at least one of over-the-air service provisioning (OTASP) activity and over-the-air parameter administration (OTAPA) activity.

In an embodiment according to the present invention, the provisioned data unit may be adapted to store at least one of update agent related provisioning information, a universal resource locator of a server used to retrieve updates, and a security key used to authenticate server messages.

In an embodiment according to the present invention, each of the plurality of update agents may have a corresponding entry in the provisioned data unit.

In an embodiment according to the present invention, one of the plurality of update agents may be designated a primary update agent and another of the plurality of update agents may be designated as a secondary update agent. The primary update agent may be used to perform updates during one of power up and reboot of the electronic device and the secondary update agent may be used to perform updates not requiring electronic device rebooting.

In an embodiment according to the present invention, the electronic device may be adapted to display a list of available update agents to an end-user and solicit selection of an update agent to be used to update at least one of software and firmware.

In an embodiment according to the present invention, the electronic device may be adapted to invoke an update agent based upon an update currently being processed provided that the update agent is provisioned in the mobile handset.

In an embodiment according to the present invention, the electronic device may execute an update application loader on reboot. The update application loader may be adapted to invoke a boot initialization code before determining to update the electronic device.

In an embodiment according to the present invention, the network may further comprise update agent provisioning information stored in the electronic device. The update agent provisioning information may comprise a device server URL, an index of provisioned update agents, a security key, and electronic device related information. The device server URL may provide references to servers hosting updates to be downloaded. The updates may be compatible with update agents currently available and provisioned in the electronic device.

In an embodiment according to the present invention, the index of provisioned update agents may provide an index value used to compute an address location of a provisioned update agent. The index of provisioned update agents may be an index to a table containing an address for an update agent in non-volatile memory the electronic device.

In an embodiment according to the present invention, the security key may be used to authenticate updates during download of updates and during update activity. A separate security key may be employed to authenticate updates by a download agent and by the update agent. The security key may be employed for secure communication, encryption, and decryption of data and messages during communication with external systems.

In an embodiment according to the present invention, the electronic device may further comprise an update agent table resident in non-volatile memory. The update agent table may contain references to a plurality of update agents currently available and provisioned in the electronic device. The update agent table may map update agent names, update agent address locations, and types of updates that the update agents are adapted to process, and provisioning status of the update agents for all available update agents in the electronic device.

In an embodiment according to the present invention, the electronic device may comprise at least one of a plurality of mobile electronic devices. The plurality of mobile electronic devices may comprise at least one of a mobile cellular phone handset, personal digital assistant, pager, MP3 player, and a digital camera.

Aspects of the present invention may be found in a method employing a plurality of update agents in an electronic device in an electronic device network. The method may comprise communicatively coupling a plurality of an electronic devices to at least one of the plurality of servers, employing at least one of a plurality of update agents resident in the electronic devices to update one of software and firmware in the electronic devices, and provisioning the plurality of update agents with parameters and data used to facilitate update operations in the electronic device.

In an embodiment according to the present invention, the method may further comprise generating updates able to be processed by at least one provisioned update agent in the electronic device and storing updates in an update server.

In an embodiment according to the present invention, the method may further comprise storing information related to an end-user's electronic device subscription and programming a provisioned data unit during number assignment module programming activity.

In an embodiment according to the present invention, number assignment module programming activity may comprise at least one of over-the-air service provisioning (OTASP) activity and over-the-air parameter administration (OTAPA) activity.

In an embodiment according to the present invention, the method may further comprise storing update agent related provisioning information, a universal resource locator of a server used to retrieve updates, and a security key used to authenticate server messages.

In an embodiment according to the present invention, the method may further comprise providing each update agent an entry in a provisioned data unit.

In an embodiment according to the present invention, the method may further comprise designating a primary update agent and a secondary update agent, and using the primary update agent to perform updates during one of power up and reboot of the electronic device and using the secondary update agent to perform updates not requiring electronic device rebooting.

In an embodiment according to the present invention, the method may further comprising displaying a list of available update agents to an end-user and soliciting selection of an update agent to be used to update at least one of software and firmware.

In an embodiment according to the present invention, the method may further comprise invoking an update agent based upon an update currently being processed provided that the update agent is provisioned in the mobile handset.

In an embodiment according to the present invention, the method may further comprise executing an update application loader on reboot of the electronic device and invoking a boot initialization code before determining to update the electronic device.

In an embodiment according to the present invention, the method may further comprising storing update agent provisioning information in the electronic device and hosting updates to be downloaded with update agents provisioned in the electronic device.

In an embodiment according to the present invention, the method may further comprise computing an address location of a provisioned update agent.

In an embodiment according to the present invention, the method may further comprise authenticating updates during download of the updates and during update activity using a security key, and employing a separate security key to authenticate updates by a download agent and by the update agent, and employing the security key for secure communication, encryption, and decryption of data and messages during communication with external systems.

In an embodiment according to the present invention, the method may further comprise mapping update agent names, update agent address locations, types of updates that the update agents are adapted to process, and provisioning status of the update agents for all available update agents in the electronic device.

In an embodiment according to the present invention, the electronic device may comprise at least one of a plurality of mobile electronic devices. The plurality of mobile electronic devices may comprise at least one of a mobile cellular phone handset, personal digital assistant, pager, MP3 player, and a digital camera.

These and various other advantages and features of novelty which characterize the invention are pointed out with particularity in the claims annexed hereto and that form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF SEVERAL VIEWS OF THE DRAWINGS

FIG. 2A is a block diagram illustrating update agent provisioning information associated with an electronic device according to an embodiment of the present invention;

FIG. 2B is a block diagram illustrating an update agent table stored in memory in an electronic device according to an embodiment of the present invention; and FIG. 2C is a block diagram illustrating an update agent table located in non-volatile memory in an electronic device according to another embodiment of the present invention.

DETAILED DESCRIPTION OF THE INVENTION

Figure 1:
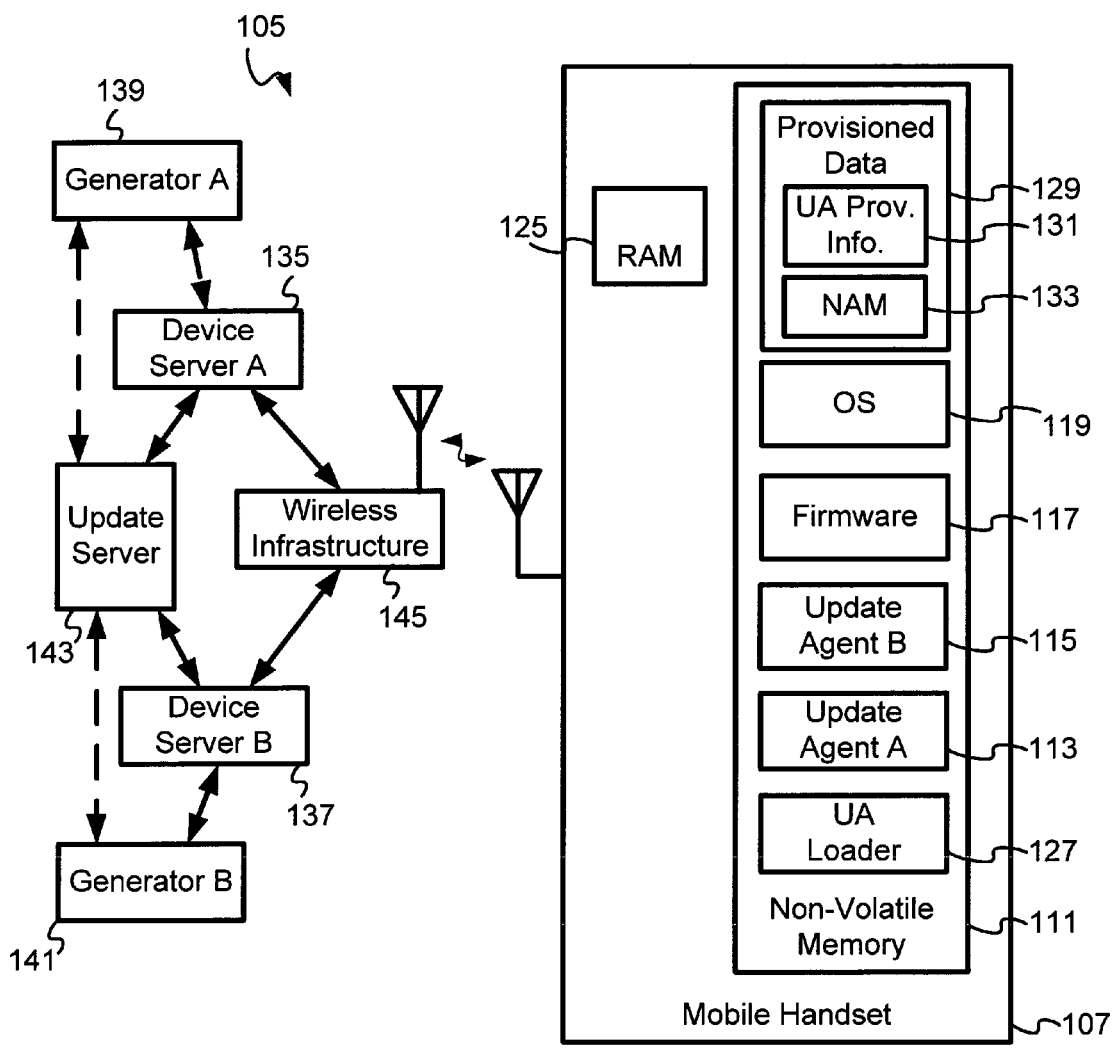
FIG. 1 is a block diagram illustrating an electronic device network according to an embodiment of the present invention.

Updating software/firmware in an electronic device may be challenging when there is very little free space available in the electronic device memory to conduct update related operations. An aspect of the present invention may be found in determining what types of code and data segments may be updateable in the electronic device. In an embodiment according to the present invention, it may be determined whether one update agent may be capable of updating all types of data and code segments resident in the electronic device. An aspect of the present invention may be found in an electronic device supporting multiple update agents, wherein each update agent may have different update capabilities.

Electronic devices may be adapted to access servers to retrieve updates for updating at least one of firmware and software. An electronic device may be, for example, a mobile electronic device having software/firmware, such as, mobile cellular phone handsets, personal digital assistants (PDA's), pagers, MP3 players, digital cameras, etc. An update may comprise firmware and software updates that modify or change the version of a particular firmware or software installed in the electronic device, for example, upgrading to a newer version, repairing a bug in the firmware/software, etc. An update may also add new services to the electronic device or delete services, as desired by a service provider, device manufacturer, or an end-user.

FIG. 1 is a block diagram an electronic device network 105 according to an embodiment of the present invention. In the electronic device network illustrated in FIG. 1, an electronic device, for example mobile handset 107, may be communicatively coupled by a wireless infrastructure 145 to at least one of a plurality of device servers, such as device server A 135 and device server B 137, for example.

The electronic device, for example, mobile handset 107, may be capable of employing one of several available update agents, for example, update agent A 113 and update agent B 115, resident in the electronic device to update software and/or firmware in the electronic device. The electronic device, for example, mobile handset 107, may also capable of provisioning the available update agents, such as for example, update agent A 113 and update agent B 115, with the necessary parameters and data needed to facilitate the respective update operations.

The electronic device, for example, mobile handset 107, may comprise random access memory (RAM) 125 and non-volatile memory 111. The non-volatile memory 111 may comprise a plurality of components, for example, an update application (UA) loader 127, an update agent A 113, an update agent B 115, a firmware 117, an operating system (OS) 119, and a provisioned data 129. The provisioned data 129 may comprise update agent provisioning information 131 and a number assignment module (NAM) 133.

The electronic device network 105 comprises mobile handset 107, a plurality of device servers, 135 and 137, an update server 143, and a plurality of generators, for example, generator A 139 and a generator B 141. The generators 139 and 141 are used to generate updates that may be processed by a corresponding one of a provisioned update agent in mobile handset 107. The update server 143 is adapted to store updates accessible by device servers 135 and 137, wherein the device servers 135 and 137 are communicatively coupled to the update server 143.

The provisioned data 129 in mobile handset 107 may be used to store information related to an end-user's electronic device subscription and the provisioned data 129 may be programmed during NAM programming activity. NAM programming activity may comprise over-the-air service provisioning (OTASP) activity or over-the-air parameter administration (OTAPA) activity.

The provisioned data 129 may also be used to store update agent related provisioning information, such as a universal resource locator (URL) of a device server or a management server that may be used to retrieve updates, a security key(s) that may be used to authenticate messages to/from the device server, and selective encryption/decryption of the messages, etc. Each update agent, such as update agent A 113 and update agent B 115, may have corresponding entries in provisioned data 129.

In an embodiment according to the present invention, if one of the update agents, such as the update agent A 113, is designated as a primary update agent, and another of the update agents, such as update agent B 115, is designated as a secondary update agent, then during an initial provisioning event in the mobile handset 107 (for example, via OTASP) either the primary or both the primary and secondary update agents may also provisioned.

The mobile handset 107 may be capable of employing one of several available update agents currently provisioned to update the firmware 117, OS 119, etc. Additionally, employing one of the update agents, such as the primary update agent, other update agents may also be updated.

In an embodiment according to the present invention, mobile handset 107 may display a list of available update agents to an end-user and solicit selection of an update agent to be used to update at least one of software and firmware.

In an embodiment according to the present invention, the mobile handset 107 may invoke an update agent based upon an update currently being processed, for example, based upon the update contents and/or characteristics, provided that the update agent is provisioned in the mobile handset 107. The update agent may also be capable of rebooting the mobile handset 107 after update completion. In an embodiment according to the present invention, a list of available updates may initially be displayed to the end-user to prompt a selection of an update by the end-user.

In an embodiment according to the present invention, the mobile handset 107 may detect an update to firmware/software when the mobile handset 107 powers up (or is rebooted). The mobile handset may determine the list of available and provisioned update agents to display to the end-user wherein the end-user may select one of the update agents to perform an update.

On power up, the mobile handset 107 may execute the update application (UA) loader 127. The UA loader 127 may invoke a boot initialization code before determining to update the mobile handset 107 and determining the list of available update agents already provisioned (such as, during an initial provisioning operation initiated by the electronic device network 105) in the mobile handset 107. A list of provisioned update agents containing references to update agent A 113 and the update agent B 115 may be displayed to the end-user. When the end-user selects one of the provisioned update agents displayed, the UA loader 127 may invoke the selected provisioned update agent and transfer control to the selected update agent.

In an embodiment according to the present invention, a selected update agent may be invoked based upon the type of update to be performed or based upon the characteristics of the update. The name of the update or a sub-component of the name of the update may be used by the UA loader 127 to determine a candidate update agent to be invoked to update a particular firmware, software, hardware configuration, etc. in the mobile handset.

In an embodiment according to the present invention, update agent A 113 may be employed to update firmware 117 and operating system 119 during reboot of the mobile handset 107. After a reboot update, update agent B 115 may be used to update other components in the mobile handset 107, for example, configuration parameters, gaming engines, third-party software, etc., that may not be updated during reboot of the mobile handset 107. Both of update agent A 113 and update agent B 115 may be provisioned with security keys for secure communications with device servers 135 and 137 during update agent provisioning activity, such as provisioning activity accompanying NAM provisioning activity and/or incorporated into NAM programming activity.

Aspects of the present invention may be found in electronic devices adapted to support multiple update agents. Each update agent may have different capabilities. Some update agents may be employed as backup update agents in a situation where a primary update agent may be faulty, inappropriate, outdated, etc.

In an embodiment according to the present invention, the mobile handset 107 may have a primary update agent, for example, update agent A 113, wherein the primary update agent may be provisioned during initial service provisioning, such as by a service representative during a purchase programming activity of the mobile handset 107 via a wired mode provisioning task or during an over-the-air (OTA) provisioning of the mobile handset 107, for example, during initial use. An update agent may be employed by the mobile handset 107 to incorporate additional updates, for example, update agent B 115. A new/additional update may also be incorporated into updates employed to update existing software/firmware of the mobile handset 107 or employed to install new applications or components.

FIG. 2A is a block diagram 205 illustrating update agent provisioning information 207 associated with an electronic device, for example, mobile handset 107, according to an embodiment of the present invention. The provisioning information may comprising a device server URL 211, an index of provisioned update agents 209, a security key(s) 213, and other related information 215. The device server URL 211 may provide references to remote device servers providing access to updates that may be downloaded. The updates may be compatible with update agents currently available and provisioned in the mobile handset 107.

In an embodiment according to the present invention, the index of provisioned update agent 209 may provide an index value that may be used to compute an address location of a provisioned update agent. For example, if the update agents are located in consecutive blocks of 64 Kbytes each, then an index value of one multiplied by a block size of 64K and added to an offset value (or preset starting address) provides the address of the provisioned update agent.

In another embodiment according to the present invention, the index of provisioned update agent 209 may be an index to a table containing an address for an update agent in storage, such as for example, non-volatile memory 111 in mobile handset 107. The security key(s) 213 may be used to authenticate updates, for example, to authenticate during download of updates or during update activity.

In an embodiment according to the present invention, a separate key may be employed to authenticate updates by a download agent/download client, (e.g., a browser), and by the update agent. In an embodiment according to the present invention, the security key(s) 213 may also incorporate keys employed for secure communications with external systems, such as keys used for encryption and decryption of data and messages during communications with external systems, such as a device server.

In an embodiment according to the present invention, the update agent provisioning information 207, values for security key(s) 213, device server URL 211, index of provisioned update agent 209, and other related information 215, (e.g., backup block address for update agents, etc.) may be populated during an OTASP/OTAPA provisioning session.

In an embodiment according to the present invention, a data synchronization session with a corresponding device server may be employed to provision the update agent provisioning information 207 with update values and parameters.

FIG. 2B is a block diagram 225 illustrating an update agent table 231 stored in non-volatile memory 111 of an electronic device, for example, mobile handset 107, according to an embodiment of the present invention. The update agent table 231 in the mobile handset 107 may provide references, such as location addresses and other related information, including information regarding update agent provisioning, to the update agents currently available in the mobile handset 107.

The update agent table 231 may maintain references to a plurality of available updates and associated update agents. When a new update agent is added, such as via an update of firmware/software in the mobile handset 107, an additional update may also be inserted into the mobile handset 107. The additional update may invoke insertion of a corresponding entry in the update agent table 231 and population thereof with associated relevant information, such as the address location of the new update agent, (i.e., where the new update agent is stored in non-volatile memory 111). An update package may be downloaded and installed in the mobile handset 107 and may result in removal of an existing update agent or replacement thereof by another.

In an embodiment according to the present invention, the update agent table 231 may comprise an array of addresses for all available update agents in the mobile handset.

FIG. 2C is a block diagram 255 illustrating an update agent table 261 located in non-volatile memory 111 of an electronic device, for example, mobile handset 107, according to an embodiment of the present invention. The update agent table in the mobile handset 107 may contain references to a plurality of update agents currently available and provisioned in the mobile handset.

The update agent table 261 may maintain, for example, a mapping between update agent names, the update agent corresponding address locations in non-volatile memory, and the type of updates that the update agents are adapted to process, for all available update agents in the mobile handset 107. The update agent table 261 may also contain optional information regarding provisioning status of the update agents, such as a provisioning flag indicating whether the associated update agent has been provisioned or not.

Entry 263 in the update agent table 261, for example, provides a mapping between the update agent name 'UA A', the address location 'Update Agent A ref', the type of updates update agent 'UA A' is adapted to process, and a provisioning flag indicating whether associated update agent has been provisioned.

The type information may be provided as 'file extensions' in an embodiment according to the present invention. For example, the file extension 'dup' may correspond to updates generated to update generators, such as generator A 139 and generator B 141, as illustrated in FIG. 1. The type field in each entry in the update agent table illustrated in FIG. 2C may be a list of file extensions in an embodiment according to the present invention.

Other structures and schemas are also contemplated for the update agent table 261. The update agent table 261 may map the name of an update agent to the location where the agent resides in memory. The update agent table 261 may also map the provisioning status of an update agent and the type(s) of updates the update agent is adapted to process. Management of the update agents may be facilitated by the mobile handset 107. New table entries for update agents may be added and entries no longer in use may be deleted, etc. Management of the update agents may be supported by client software, such as a device management client.

Aspects of the present invention may be found in a mobile handset 107 having and supporting multiple update agents. The update agents may be selected for processing updates and applying firmware, software, and hardware configuration updates, and selecting an update agent from a plurality of available update agents based upon evaluated criteria, such as the type of the update to be to be performed.

Although a system and method according to the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by this disclosure and the appended diagrams. It is intended that the scope of the invention be limited not with this detailed description, but rather by the claims appended hereto.

What is claimed is:

1. An electronic device network, the network comprising:
   a plurality of servers;
   a plurality of electronic devices communicatively coupled to at least one of the plurality of servers, each of the electronic devices being adapted to employ at least one of a plurality of update agents resident in the electronic device, wherein the update agent employed is selected to correspond to a type of update information received by the electronic device from the at least one of the plurality of servers, wherein the selected update agent processes the received update information to modify a first version of one of software and firmware in the electronic device to a second version, and wherein the electronic device is also adapted to provision the plurality of update agents with parameters and data used to facilitate update operations in the electronic device, wherein the electronic device comprises random access memory and non-volatile memory, wherein the non-volatile memory comprises a plurality of components, the plurality of components comprising at least one of the following: an update application loader, the plurality of update agents, firmware, an operating system (OS), and provisioned data; and wherein the provisioned data comprises update agent provisioning information and a number assignment module;
   wherein the electronic device comprises a provisioned data unit adapted to store information related to an end-user's electronic device subscription, and wherein the provisioned data unit may be programmed during number assignment module programming activity;
   wherein the number assignment module programming activity comprises at least one of over-the-air service provisioning (OTASP) activity and over-the-air parameter administration (OTAPA) activity; and
   a database in each of the plurality of electronic devices for accessing the plurality of provisioned update agents in a corresponding electronic device.

2. The network according to claim 1, wherein the network comprises at least one of an update server, and a plurality of generators, wherein the generators are adapted to generate updates able to be processed by at least one provisioned update agent in the electronic device, and wherein the update server is adapted to store updates accessible by the plurality of servers.

3. The network according to claim 1, wherein the provisioned data unit is adapted to store at least one of update agent related provisioning information, a universal resource locator of a server used to retrieve updates, and a security key used to authenticate server messages.

4. The network according to claim 1, wherein each of the plurality of update agents has a corresponding entry in the provisioned data unit.

5. The network according to claim 1, wherein one of the plurality of update agents is designated a primary update agent and another of the plurality of update agents is designated as a secondary update agent, and wherein the primary update agent is used to perform updates during one of power up and reboot of the electronic device and the secondary update agent is used to perform updates not requiring electronic device rebooting.

6. The network according to claim 1, wherein the electronic device is adapted to display a list of available update agents to an end-user and solicit selection of an update agent to be used to update at least one of software and firmware.

7. The network according to claim 1, wherein the electronic device is adapted to invoke an update agent based upon an update currently being processed provided that the update agent is provisioned in the electronic device.

8. The network according to claim 1, wherein the electronic device may execute an update application loader on reboot, and wherein the update application loader is adapted to invoke a boot initialization code before determining to update the electronic device.

9. The network according to claim 1, comprising update agent provisioning information stored in the electronic device, the update agent provisioning information comprising at least one of the following: a device server URL, an index to the database for accessing the plurality of provisioned update agents, a security key, and electronic device related information, wherein the device server URL provides references to servers hosting updates to be downloaded, and wherein the updates are compatible with update agents currently available and provisioned in the electronic device.

10. The network according to claim 9, wherein the index to the database for accessing the plurality of provisioned update agents provides an index value used to compute an address location of a provisioned update agent, and wherein the index to the database for accessing the plurality of provisioned update agents provides an index to a table containing an address for an update agent in non-volatile memory the electronic device.

11. The network according to claim 9, wherein the security key is used to authenticate updates during download of updates and during update activity, wherein a separate security key is employed to authenticate updates by a download agent and by the update agent, and wherein the security key is employed for at least one of the following: secure communication, encryption, and decryption of data and messages during communication with external systems.

12. The network according to claim 1, wherein the database for accessing the plurality of provisioned update agents in the electronic device comprises an update agent table resident in non-volatile memory, the update agent table containing references to a plurality of update agents currently available and provisioned in the electronic device, the update agent table associating update agent names, update agent address locations, types of updates that the update agents are adapted to process, and provisioning status of the update agents for all available update agents in the electronic device.

13. The network according to claim 1, wherein the electronic device comprises at least one of a plurality of mobile electronic devices, and wherein the plurality of mobile electronic devices comprise at least one of the following: a mobile cellular phone handset, a personal digital assistant, a pager, an MP3 player, and a digital camera.

14. A method employing a plurality of update agents in an electronic device in an electronic device network, the method comprising:
communicatively coupling a plurality of electronic devices to at least one of a plurality of servers;
selecting at least one of a plurality of update agents resident in the electronic device to modify a first version of one of software and firmware in the electronic device to produce an updated version, wherein each of the plurality of update agents is arranged to process a corresponding type of update information received from the at least one of a plurality of servers;
provisioning the plurality of update agents with parameters and data used to facilitate update operations in the electronic device, wherein a database is used for accessing the plurality of provisioned update agents;
storing information related to a provisioned data unit for an end-user's electronic device subscription;
programming the provisioned data unit during number assignment module programming activity, wherein the number assignment module programming activity comprises at least one of the following: over-the-air service provisioning (OTASP) activity and over-the-air parameter administration (OTAPA) activity.

15. The method according to claim 14, comprising generating updates able to be processed by at least one provisioned update agent in the electronic device and storing updates in an update server.

16. The method according to claim 14, wherein the programming comprises storing update agent related provisioning information, a universal resource locator of a server used to retrieve updates, and a security key used to authenticate server messages.

17. The method according to claim 14, comprising providing each update agent an entry in a provisioned data unit.

18. The method according to claim 14, comprising:
designating a primary update agent and a secondary update agent;
using the primary update agent to perform updates during one of the following: power up and reboot of the electronic device; and
using the secondary update agent to perform updates not requiring electronic device rebooting.

19. The method according to claim 14, comprising:
displaying a list of available update agents to an end-user; and
soliciting selection of an update agent to be used to update at least one of software and firmware.

20. The method according to claim 14, comprising invoking an update agent based upon an update currently being processed provided that the update agent is provisioned in the electronic device.

21. The method according to claim 14, comprising executing an update application loader on reboot of the electronic device and invoking a boot initialization code before determining to update the electronic device.

22. The method according to claim 14, comprising:
storing update agent provisioning information in the electronic device; and
hosting updates to be downloaded with update agents provisioned in the electronic device.

23. The method according to claim 14, comprising determining an address location of a provisioned update agent via the database for accessing the plurality of provisioned update agents, wherein determining comprises one of computing and accessing an entry in a table.

24. The method according to claim 14, comprising:
authenticating updates during download of the updates and during update activity, using a security key;
employing a separate security key to authenticate updates by a download agent and by the at least one of a plurality of update agents; and
employing the security key for at least one of the following: secure communication, encryption, and decryption of data and messages, during communication with external systems.

25. The method according to claim 14, comprising mapping at least one of the following: update agent names, update agent address locations, types of updates that the update agents are adapted to process, and provisioning status of the update agents, for all available update agents in the electronic device.

26. The method according to claim 14, wherein the electronic device comprises at least one of the following: a plurality of mobile electronic devices, and wherein the plurality of mobile electronic devices comprise at least one of a mobile cellular phone handset, a personal digital assistant, a pager, an MP3 player, and a digital camera.

27. An electronic device operable in an electronic device network, the electronic device comprising:
non-volatile memory comprising a first version of code;
communication circuitry for receiving, from at least one server in the electronic device network, update information having an associated type;
code resident in and executable by the electronic device, the code comprising a plurality of provisioned update agents selectable to cause processing of a corresponding type of received update information, to update a related code portion of the first version of code to an updated version, wherein a database in the electronic device enables accessing of the plurality of provisioned update agents;
wherein the processing modifies the related code portion of the first version of code to produce the updated version;
wherein the electronic device comprises random access memory and non-volatile memory, wherein the non-volatile memory comprises a plurality of components, the plurality of components comprising at least one of the following: an update application loader, the plurality of update agents, firmware, an operating system (OS), and provisioned data, and wherein the provisioned data comprises update agent provisioning information and a number assignment module;
wherein the electronic device comprises a provisioned data unit adapted to store information related to an end-user's electronic device subscription, and wherein the provisioned data unit may be programmed during number assignment module programming activity;

wherein the number assignment module programming activity comprises at least one of over-the-air service provisioning(OTASP) activity and over-the-air parameter administration (OTAPA) activity; and wherein a provisioned update agent is selected to perform an update based upon the type of the received update information.

28. The electronic device according to claim 27 wherein the communication circuitry comprises a cellular network interface.

29. The electronic device according to claim 27 wherein the update information comprises an update package.

30. The electronic device according to claim 27 wherein a portion of the non-volatile memory comprises provisioned data received from at least one of the plurality of servers.

31. The electronic device according to claim 30 wherein the provisioned data comprises at least one entry corresponding to one of the plurality of provisioned update agents.

32. The electronic device according to claim 30 wherein provisioned data comprises a universal resource locator of a server on which a corresponding type of update information is stored.

33. The electronic device according to claim 30 wherein provisioned data comprises security information enabling update of the related code portion.

* * * * *